Jan. 28, 1964    J. A. WILSON III, ET AL    3,119,595
BLADED ROTOR AND BAFFLE ASSEMBLY
Filed Dec. 29, 1961
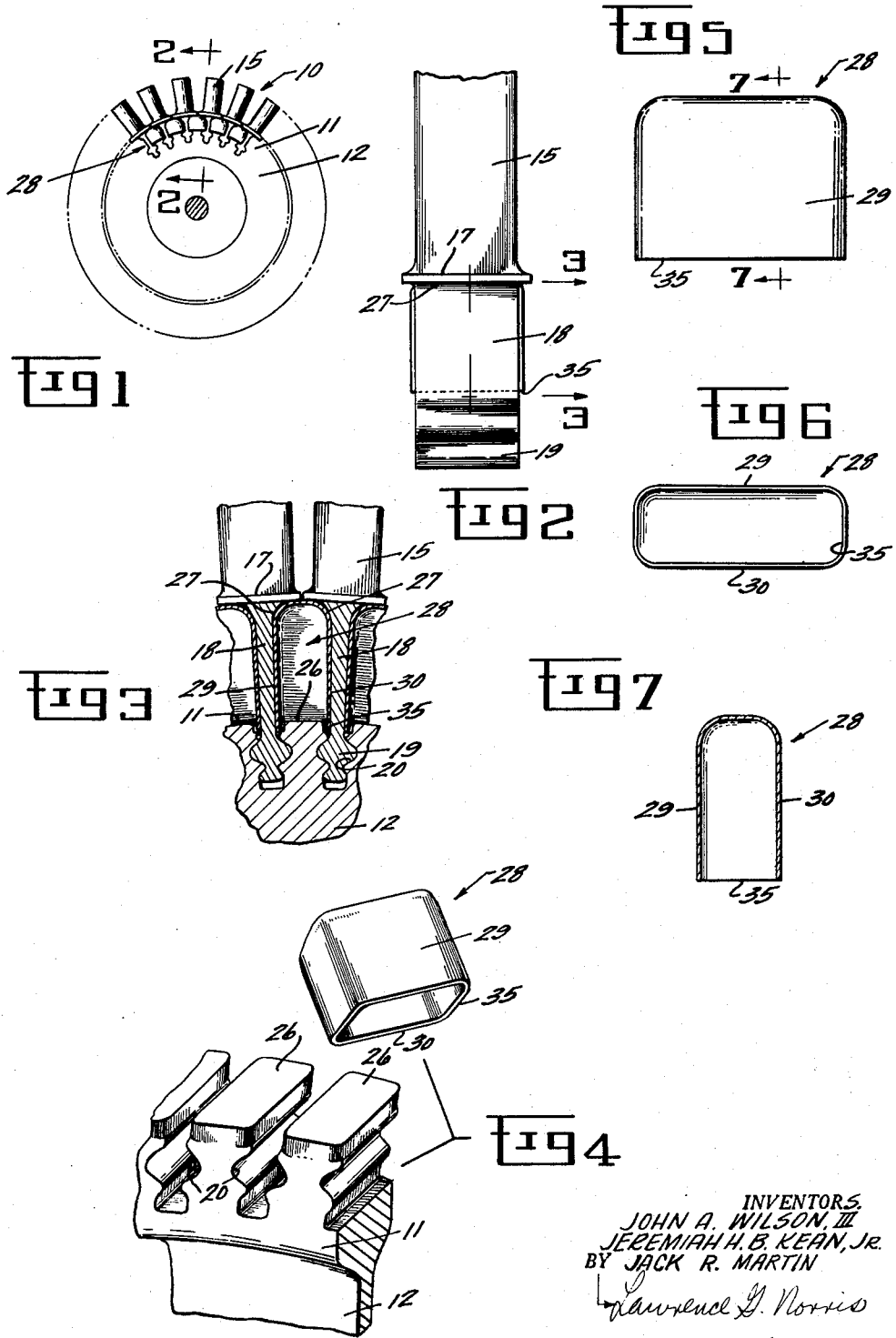
INVENTORS.
JOHN A. WILSON III
JEREMIAH H. B. KEAN, JR.
BY JACK R. MARTIN
Lawrence G. Norris
ATTORNEY

United States Patent Office 3,119,595
Patented Jan. 28, 1964

3,119,595
BLADED ROTOR AND BAFFLE ASSEMBLY
John Amerman Wilson III, South Hamilton, Jeremiah Henry Brode Kean, Jr., Lynnfield Center, and Jack Reid Martin, Bedford, Mass., assignors to General Electric Company, a corporation of New York
Filed Dec. 29, 1961, Ser. No. 163,259
7 Claims. (Cl. 253—77)

Our invention relates to a bladed rotor and baffle assembly and has particular application to gas turbine rotors of the type utilizing long shank buckets.

It is a relatively common practice in the design of turbine rotors for gas turbine engines to utilize long shank buckets in which a relatively long radially extending shank interconnects the bucket root and the bucket platform which defines the radially inward limit of the gas flow-path. In the typical construction, the shanks themselves are relatively thin and the spacing between adjacent buckets is such that circumferential spaces are formed between the shanks.

In order to prevent leakage through these spaces and to provide bucket vibration damping, the spaces are usually plugged by means of elements commonly called baffles or "mailboxes." Although seemingly simple devices, the design of baffles for high temperature gas turbine applications involves a number of problems. Although in the turbine assembly the baffles are held against radial and circumferential movement by the shanks and the bucket platforms, it will be appreciated that additional means must be provided for retaining the baffles in the axial direction. This has been accomplished in several designs bending out or securing tabs or similar protrusions on the baffles which engage portions of the shanks or the wheel rim to secure the baffles against axial movement.

Such an approach usually gives rise to a relatively complicated baffle shape with resulting stress concentrations occurring at the bends or at the points of attachment of the tabs. In operation this can result in fatigue cracking arising from thermal cycling and vibration stresses imposed on the baffles. In fact, considerable difficulty has been experienced in this respect.

In addition, there are problems of light weight, low cost and ease of assembly and disassembly, all of which must be satisfied along with the operating and performance requirements.

It is accordingly an object of our invention to provide an improved bladed rotor and baffle assembly in which the baffle is formed of a smooth, single piece element in which stress concentrations are significantly reduced and which is light weight and low in cost to manufacture.

It is another object of our invention to provide an improved bladed rotor and baffle assembly in which cooperating structure is provided on the rotor disk and on the baffle for retaining the baffle against axial movement, which cooperating structure permits a significantly simplified baffle shape and which allows ease of assembly and disassembly.

We accomplish these and other objects of our invention, in one embodiment thereof, by providing a bladed rotor and baffle assembly in which the baffles are formed of a single piece, generally cup-shaped construction and in which the rotor disk is formed with radially extending pedestal projections shaped to enter and engage the open ends of the cup-shaped baffles. The baffles are thus in the form of smooth, single piece cups which fit over the pedestals on the rotor rim between adjacent dovetail cuts and which are then retained in the axial direction by the pedestals and, after the assembly of the buckets on the rotor, in the radial and circumferential directions by the shanks and the bucket bases. The baffles may be formed in light weight configurations and at low cost by deep drawing or by other processes and the absence of tabs or other similar discontinuities contributes not only to the light weight and low cost, but also greatly reduces stress concentrations.

Our invention will be better understood and various other objects and advantages thereof will become apparent from the following description taken in connection with the accompanying drawing in which:

FIG. 1 is an axial or end view of a turbine wheel and baffle assembly embodying our invention;

FIG. 2 is an enlarged, fragmentary sectional view along the line 2—2 of FIG. 1;

FIG. 3 is an enlarged fragmentary sectional view along the line 3—3 of FIG. 2;

FIG. 4 is a fragmentary perspective view of a rim of a bladed disc similar to that shown by FIG. 1 with an exploded view showing a removal baffle member formed in accordance with the invention;

FIG. 5 is a plan view of the baffle member formed in accordance with the invention;

FIG. 6 is a bottom view of the baffle member shown by FIG. 5; and

FIG. 7 is a sectional view of the baffle member along the line 7—7 of FIG. 5.

Referring to the drawings, and particularly to FIG. 1, we show a turbine rotor assembly formed of a plurality of radially extending buckets 10 circumferentially spaced about the periphery of rim 11 of the wheel or disc 12.

As seen more clearly in FIGS. 2 and 3, the adjacent buckets 10 are formed to define radially extending blade portions 15 which are positioned in an axial fluid flow that passes through the multi-stage compressor or turbine assembly during operation of the assembly. The blade portion 15 of each vane is formed into a circumferentially extending platform portion 17 which defines the inner limit of the gas flow path. Each of the buckets 10 extend radially inwardly to define a shank portion 18 that terminates in a dovetail root portion 19 which is adapted to engage an axially aligned dovetail root receiving slot 20. The dovetail attachment as shown by FIG. 3 is illustrative only and any suitable attachment means may, of course, be used. The disc 12 has a rim 11 which in accordance with the invention is formed with a plurality of circumferentially spaced pedestal projections 26. In the form shown by FIG. 3, the shank portions 18 of the adjacent buckets have wall surfaces that cooperate to develop a complementary arch surface 27.

A fragmentary portion of the periphery or rim 11 of a wheel or disc 12 is more clearly shown by FIG. 4 wherein the pedestal projections 26 are adapted to receive a baffle member 28 formed in accordance with the invention that is adapted to securely engage the periphery of a respective one of the pedestal projections 26. The baffle member 28 is formed to engage the periphery of each pedestal projection 26 and overlap the same as shown by FIG. 3 to extend radially from the rim 11 and fill the space or archway 27 formed by the adjacent wall arch surfaces of the shank portions 18 of each vane.

The improved baffle member 28 of the invention is formed from a metal blank that is deep drawn into a generally cup-shaped configuration such as shown by FIGS. 5–7. The baffle member 28 has smooth, continuous exterior surfaces defined by opposing walls 29 and 30 that have generally parallel portions joined by integral curved portions. The improved baffle member has no tabs or projections protruding therefrom such as might be developed by folding or crimping the baffle member 28. The baffle member 28 has an edge 35 that is formed to overlap the periphery of each pedestal projection 26 as previously described and shown by FIGS. 3 and 4.

When the improved baffle member 28 is positioned to overlap the periphery of each pedestal projection 26, the baffle member 28 in cooperation with the arch surfaces 27 provides a mechanical damping means for induced vibration forces impressed thereon by the adjacent shank portions 18 of the buckets. At the same time, the baffle member 28 provides an aerodynamic seal for the archway or space 27 between the adjacent bucket shanks 18 so that an axial flow of gases through the archway is prevented. The turbine baffle member 28 additionally provides an insulation for the peripheral rim 11 of the disc 12. Further, since the baffle member 28 is preferably formed from a single blank that is deep drawn into a cup-shape, a smooth continuous wall is developed that minimizes the formation of stress concentrations and fatigue cracking in the baffle member 28 during operation of the multi-stage compressor or turbine assembly.

It will thus be seen that we have provided an improved bladed rotor and baffle assembly, particularly suitable to gas turbine applications, in which the baffle is formed of a single piece, smooth cup-shaped member and in which the rotor disk is provided with radially extending pedestals shaped to enter and engage the open ends of the baffles for retention purposes. Assembly is accomplished very simply by placing the baffles on the pedestals and then sliding the buckets into the dovetail slots, thereby forming an integral assembly in which the baffles are retained in all directions. In addition, the construction allows the baffles to be formed inexpensively in a simple, light weight shape which is free from tabs, protrusions or other stress risers.

As will be evidenced from the foregoing description, certain aspects of the invention are not limited to the particular details of the constructions illustrated. It is contemplated that other modifications and applications will occur to those skilled in the art and it is, therefore, intended that the appended claims shall cover such modifications and applications that do not depart from the true spirit and scope of the invention.

Having described the invention, what is claimed is:

1. A bladed rotor and baffle assembly comprising;
    (a) a disc rim having a plurality of circumferentially spaced bucket receiving slots,
    (b) a plurality of pedestal projections radially extending from said rim between adjacent slots,
    (c) a plurality of radially extending buckets respectively adapted to engage associated ones of said slots,
    (d) said buckets having circumferentially extending platforms adapted to define a segmented ring circumjacent said rim, and
    (e) a plurality of generally cup-shaped baffles,
    (f) each of said baffles having respective edges adapted to engage and overlap selected ones of said pedestal projections and further having exterior surfaces shaped to interfit with the wall surfaces of adjacent vanes between said platform and rim surfaces.

2. The assembly of claim 1 in which each of said generally cup-shaped baffles is deep drawn from a suitable blank to form an external wall having a smooth configuration and having a minimum number of corners and bends therein.

3. The assembly of claim 2 in which each of said deep drawn baffles has opposing walls having generally parallel portions joined by integral curved portions to define said cup-shaped member having an open wall.

4. An axial flow bladed rotor and baffle assembly comprising,
    (a) a disc rim having a plurality of circumferentially spaced bucket receiving slots,
    (b) a plurality of pedestal projections radially extending from said rim between adjacent slots,
    (c) a plurality of radially extending buckets respectively adapted to engage associated ones of said slots,
    (d) said buckets having circumferentially extending platforms adapted to define a segmented ring circumjacent said rim,
    (e) each of said buckets further having a shank portion between said ring and said rim adapted to cooperate with adjacent shank portions to form an archway above each of said pedestal projections, and
    (f) a plurality of generally cup-shaped baffles,
    (g) each of said baffles having respective edges adapted to engage and overlap selected ones of said pedestal projections and having exterior surfaces shaped to interfit said archway.

5. The assembly of claim 4 in which each of said generally cupshaped baffles is deep drawn from a suitable blank to form an external wall having a smooth configuration and having a minimum number of corners and bends therein.

6. The assembly of claim 5 in which each of said deep drawn baffles has opposing walls having generally parallel portions joined by integral curved portions to define said cupshaped member having an open wall.

7. In a turbine and baffle assembly having longshank buckets secured to a turbine disc:
    (a) a series of radially extending pedestal projections positioned on the periphery of said disc intermediate the points of attachment of said buckets to said disc, and
    (b) a series of cupshaped baffles formed to fit over and engage said pedestals and shaped to plug the spaces between the bucket shanks.

References Cited in the file of this patent

UNITED STATES PATENTS

| | | |
|---|---|---|
| 2,618,460 | Williams | Nov. 18, 1952 |
| 2,669,383 | Purvis et al. | Feb. 16, 1954 |
| 2,755,063 | Wilkinson | July 17, 1956 |
| 3,001,760 | Guernsey et al. | Sept. 26, 1961 |